United States Patent [19]
Aiki

[11] Patent Number: 6,132,314
[45] Date of Patent: Oct. 17, 2000

[54] OPERATIONAL INPUT DEVICE FOR SIMULATOR

[75] Inventor: Shinichiro Aiki, Tokyo, Japan

[73] Assignee: Namco Limited, Tokyo, Japan

[21] Appl. No.: 09/076,782

[22] Filed: May 13, 1998

[30] Foreign Application Priority Data

May 23, 1997 [JP] Japan ................................. 9-150284

[51] Int. Cl.[7] ........................................................ A63F 9/14
[52] U.S. Cl. ................................ 463/37; 463/36; 463/38
[58] Field of Search ............................. 434/373; 463/37, 463/38, 39, 36, 1, 2, 5, 6; 273/148

[56] References Cited

U.S. PATENT DOCUMENTS

3,951,095  4/1976  Jewett ..................................... 115/24.1
4,317,570  3/1982  Brunton .................................. 273/246
5,125,843  6/1992  Holloway ................................. 434/45
5,713,794  2/1998  Shimojima et al. ...................... 463/36

Primary Examiner—William A. Cuchlinski, Jr.
Assistant Examiner—Marthe Marc-Coleman
Attorney, Agent, or Firm—Burns, Doane, Swecker & Mathis, LLP

[57] ABSTRACT

An operational input device is operated by an operator to control an image displayed on a projector screen. A grip bar is arranged such that it extends laterally of the operator sitting on a seat. The grip bar is rotatable around each of a vertical axis and a horizontal axis, so that it can freely move about the respective vertical and horizontal axes within a three dimensional space. Therefore, the operator can operate the grip bar as if it is a paddle of a canoe. Since the grip bar extends laterally of the operator, a plurality of operators can grasp the grip bar simultaneously.

13 Claims, 7 Drawing Sheets

OPERATIONAL INPUT DEVICE FOR SIMULATOR

BACKGROUND OF THE INVENTION

1. Field of the Invention

The present invention relates to an operational input device operated by an operator in order to control a picture displayed on an image display device such as a projector.

2. Description of the Related Art

The simulator in which a picture displayed on such as projector is controlled by operating an operational input device by an operator is well known. In the conventional simulator, a member simulating a steering handle of an automobile or a stick like member called as a joy stick, etc., is used. Since the operational input device such as the steering handle or the joy stick is provided under an assumption that a single operator operates it, it is difficult to operate it by a plurality of operators in cooperation with each other.

Further, in a park, etc., a personal experience facility to experience a rowing of a boat on a pond has been known. However, since rowing of a boat is practically not easy for women, old men, children, etc., there has been a request of experiencing the rowing easily. In order to respond to such request, a simulator has been considered in which a picture related to a rowing of a boat is displayed on a projector screen and an operator simulates the rowing operation while watching the picture. However, it is very unnatural to simulate the boat rowing by means of an operational input device such as the steering handle or the joy stick, etc.

SUMMARY OF THE INVENTION

The present invention was made in view of the above mentioned problem and has an object to provide an operational input device capable of simulating a rowing of a boat and capable of operating it by a plurality of operators simultaneously.

In order to achieve the above object, an operational input device of a simulator, which is operated by an operator or operators to control a picture displayed on a video display, according to the present invention, is featured by comprising a rotatable grip bar which is rotatable about each of two orthogonal rotation axes extending laterally with respect to an operator.

Figure 11:
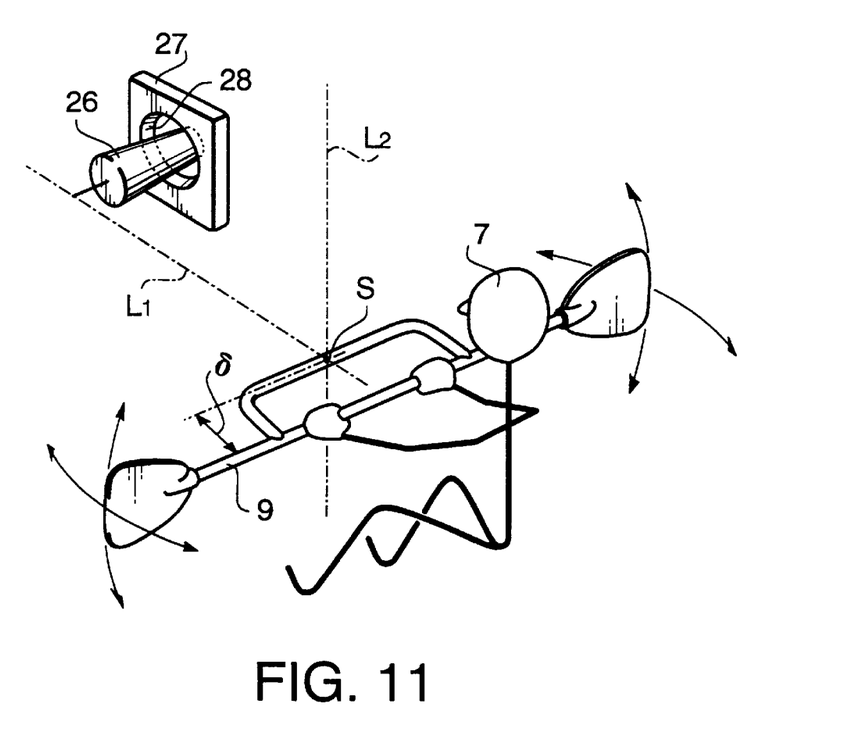
FIG. 11 illustrates a function of the structure shown in FIGS. 3 and 4.

The operational input device is illustrated in FIG. 11. In FIG. 11, an operator 7 grips a grip bar 9 and operates it. The grip bar 9 rotates about each of two orthogonal axes, that is, a horizontal axis L1 and a vertical axis L2, according to an operation of the operator 7. When the operator 7 operates the grip bar 9 in a composite direction of horizontal and vertical directions, it is possible to simulate a boat rowing operation. Therefore, by displaying a picture related to a boat rowing on a projector screen, detecting an amount of operation of the grip bar 9 by a suitable detector and controlling the picture on the basis of the detected amount of operation, the rowing operation of a boat can be simulated with realism. Therefore, it is possible to enjoy the rowing of boat without necessity of attending to an experience facility.

Since the grip bar 9 extends laterally of the operator 7, a plurality of operators can grip the grip bar 9 simultaneously. Therefore, it is possible that a plurality of operators 7 can perform an input operation in cooperation with each other or an expert operator can simulate the rowing while teaching people who are unfamiliar with the rowing. Further, since the grip bar 9 extends laterally of the operator 7, this operational input device is suitable to simulate a paddling in canoeing.

The operational input device having a construction mentioned above can be embodied in the following manners:

(1) The grip bar 9 may be arranged in a position deviated from one of the orthogonal two axes L1 and L2, for example, the vertical axis L2, by a predetermined distance δ. With such arrangement of the grip bar 9, the rotation fulcrum of the grip bar 9 is positioned in a position remote from the grip bar 9, so that the whole grip bar 9 can be opened to the operator or operators. As a result, the operator 7 can grip any portion of the grip bar 9, facilitating the handling thereof. This is particularly advantageous when there are a plurality of operators.

(2) The operational input device of the present invention may be provided with a guided bar 26 which is moved integrally with the grip bar 9 within a three dimensional space and a guiding member 27 having a circular guide hole 28 for restricting the movement of the guided member 26. With this construction being employed, when the grip bar 9 operated by the operator 7 is freely rotated in a three dimensional space about the fulcrum S, that is, the cross point of the orthogonal axes L1 and L2, the guided member 26 moves in the three dimensional apace integrally with the grip bar 9. The movement of the guided member 26 is limited within a range defined by the guide hole 28 of the guide member 27. That is, the range within which the grip bar 9 can be operated by the operator 7 is limited by the guide member 27, so that an over-movement of the grip bar 9 is prevented.

(3) The operational input device of the present invention may be provided with resistive force application means for applying a resistive force to the grip bar 9 when the grip bar 9 is deviated from the neutral position, for example, the horizontal state. The resistive force application means may be provided for each of the rotation canter axes L1 and L2. That is, when the grip bar 9 rotates about each rotation center axis, the resistive force application means of each rotation center axis resists the movement of the grip bar 9. Since, therefore, various resistive forces such as force blocking the movement of the grip bar, reactive force and vibration, etc., corresponding to an amount of operation of the grip bar by the operator can be applied to the grip bar, enhancing the realistic feeling of simulation.

The resistive force can be applied to the grip bar in various ways. For example, it is possible to apply such force to the grip bar 9 by using a fluid cylinder utilizing compressible fluid such as air, that is an air cylinder. In the latter case, since the compressible fluid itself can be compressed, the grip bar 9 can move in one direction while compressing the compressible fluid and, therefore, a restoring force is generated by the compressed fluid. On the restoring force thus generated, a reactive force is applied to the grip bar 9. In other words, the fluid cylinder utilizing compressible fluid is effective in that it can apply the reactive force to the grip bar 9 correspondingly to the movement thereof while allowing the movement of the grip bar 9.

The effect of applying the reactive force to the grip bar 9 while allowing the movement of the grip bar 9 may be obtained by utilizing a resilient member of such as rubber.

Alternatively, the resistive force may be applied to the grip bar 9 by using a fluid cylinder utilizing non-compressible fluid, for example, a hydraulic cylinder. In the latter case, since the non-compressible fluid itself is not compressed, it is possible to block the movement of the grip bar 9 in a certain direction by the fluid cylinder. However, the effect of applying the reactive force to the grip bar 9 while allowing the movement of the grip bar 9 can not be obtained.

When a rowing operation of a boat is simulated by using the operational input device of the present invention, it is necessary to simulate a situation that the paddle moves through water while pushing water backward. In simulating such situation, it is possible to employ a method in which reactive force is applied to the grip bar 9 while allowing a movement thereof by using a fluid cylinder utilizing compressible fluid such as air.

Incidentally, when a hydraulic cylinder is used as the resistive force source, there is a possibility of leakage of oil, causing the life of the operational input device to be shortened. On the contrary, an operation of the air cylinder and/or operations of various units arranged around the air cylinder are not disturbed by air leakage if any and so the life of the operational input device is not influenced by air leakage.

(4) In the case where the air cylinder is used as the resistive force application means, it is preferable to form a thin orifice in at least one of two air input/output ports provided in the air cylinder. With such structure of the air cylinder, when the grip bar 9 is moved in a certain one direction by a predetermined stroke and then stopped, air in the cylinder gradually goes out through the orifice while being compressed and completely discharged therefrom after a predetermined time lapsed. As a result, a large reactive force is applied to the grip bar 9 in an initial stage of the movement thereof and the reactive force is gradually reduced to finally zero while the grip bar 9 is moved against the reactive force. Such relation between the movement of the grip bar 9 and the reactive force applied thereto can produce with reality the situation of the operator paddling on a canoe.

(5) When the air cylinder having the orifice as the resistive force application means is used, it is preferable to communicate one of the two air input/output ports with the other through a hose. It is of course possible to realize the expected resistive force application by the air cylinder with the air input/output ports of the air cylinder being opened without using the hose. However, in such case, large exhaust sound is generated when air passes through the ports and such exhaust sound may become obstacle for the reality of simulation. When the ports are communicated by the hose, it is possible to prevent air exhaust sound from being generated to thereby prevent the performance of the simulator from being degraded.

(6) When the air cylinder is used as the resistive force application means, it is possible to connect at least one of the two air input/output ports of the air cylinder to an air supply source. It is possible to forcibly apply a reactive force or vibration to the grip bar by actuating the air supply source and hence to improve the reality of simulation.

DETAILED DESCRIPTION OF THE PREFERRED EMBODIMENTS

Figure 1:
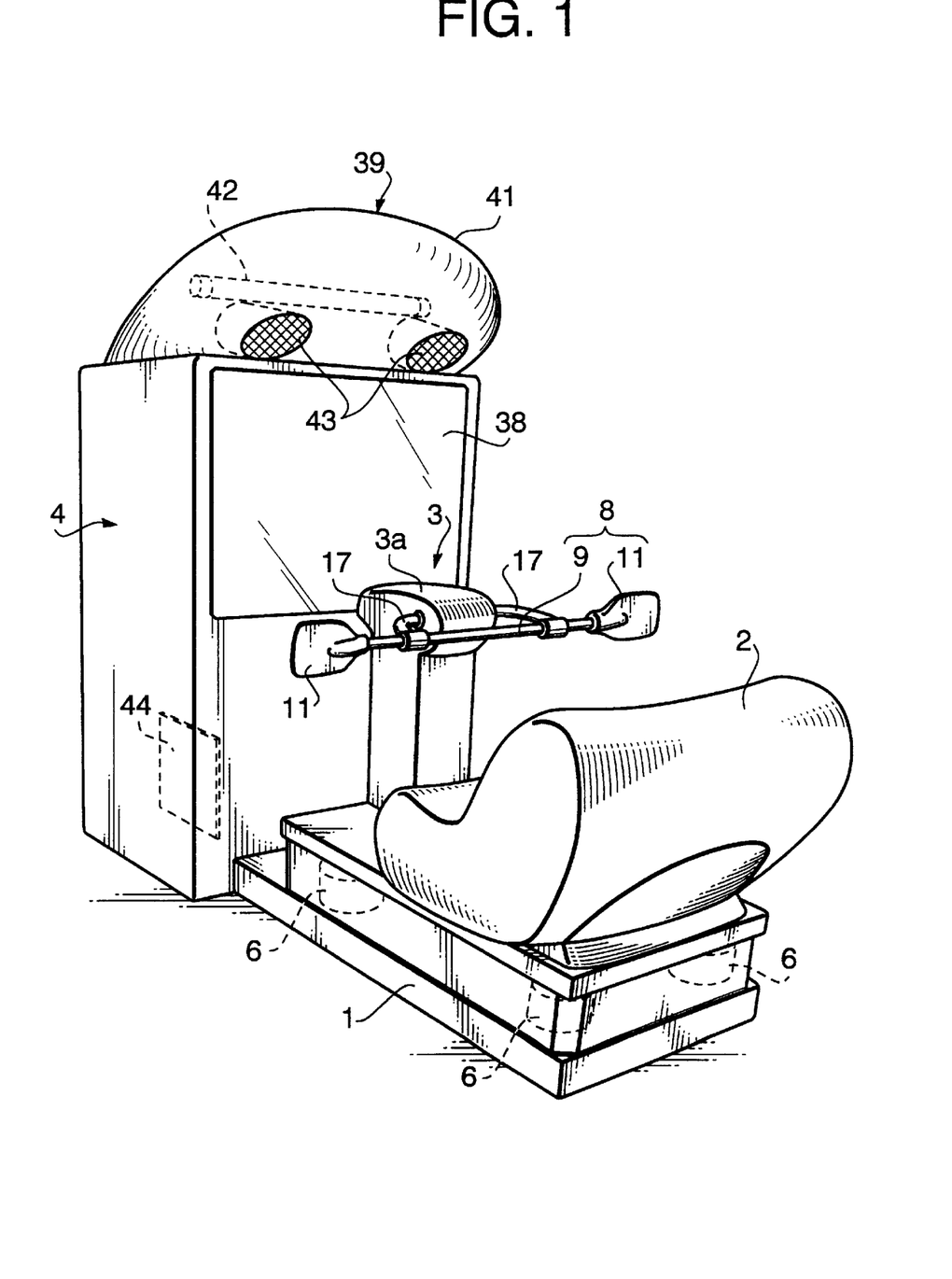
FIG. 1 is a perspective view of an embodiment of a simulator utilizing an operational input device according to the present invention.
Figure 2:
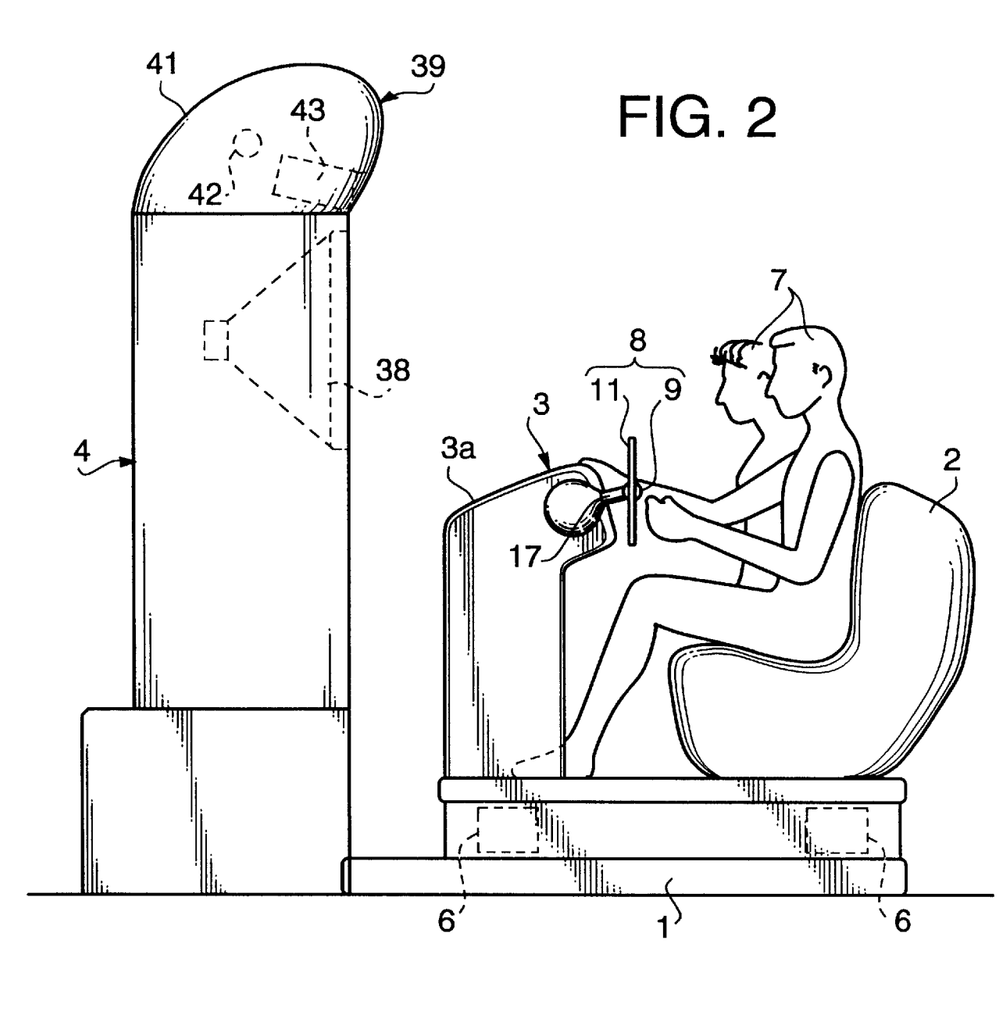
FIG. 2 is a side view of the simulator shown in FIG. 1, with an operator thereof being in place.

FIG. 1 shows an embodiment of a simulator utilizing an operational input device according to the present invention. The simulator comprises a seat 2 provided on a base 1, an operation unit 3 provided on the base 1 and a casing 4 provided in front of the base 1. The seat 2 is formed by molding a seat form with a material, for example, hard urethane, covering the seat form with a sponge sheet and further covering the sponge sheet covered seat form with a leatherette. According to the seat 2 having this construction, it is possible to provide a situation with high reality, in which an operator 7 is on a canoe on a surface of water. It is preferable that the seat 2 is large enough to accommodate with one or two operators 7 as shown in FIG. 2, or more operators 7 on demand.

A plurality of air springs 6 are provided between the base 1 and the seat 2 as means for providing a realism to the operator. In the shown embodiment, four air springs 6 are arranged in respective corners of the base 1. These air springs 6 are connected to an air supply source, which is not shown, such that air can be selectively supplied to at least one of the air springs. The air spring 6 to which air is supplied expands upward to tilt or jump the seat 2. The operator 7 on the seat 2 thus tilted or jumped can experience the canoe moving along a river while being tilted or jumped.

In FIG. 1, the operation unit 3 includes an operational input device having an operational input member 8 in the form of a paddle. The operational input member 8 is composed of a grip bar 9 extending laterally of an operator 7 sitting on the seat 2 (see FIG. 2), that is, in a vertical direction on the sheet of FIG. 2, and fins 11 fixed to opposite ends of the grip bar 9. Since the grip bar 9 extends laterally of the operator 7, it can be gripped by additional operators without any problem.

Figure 3:
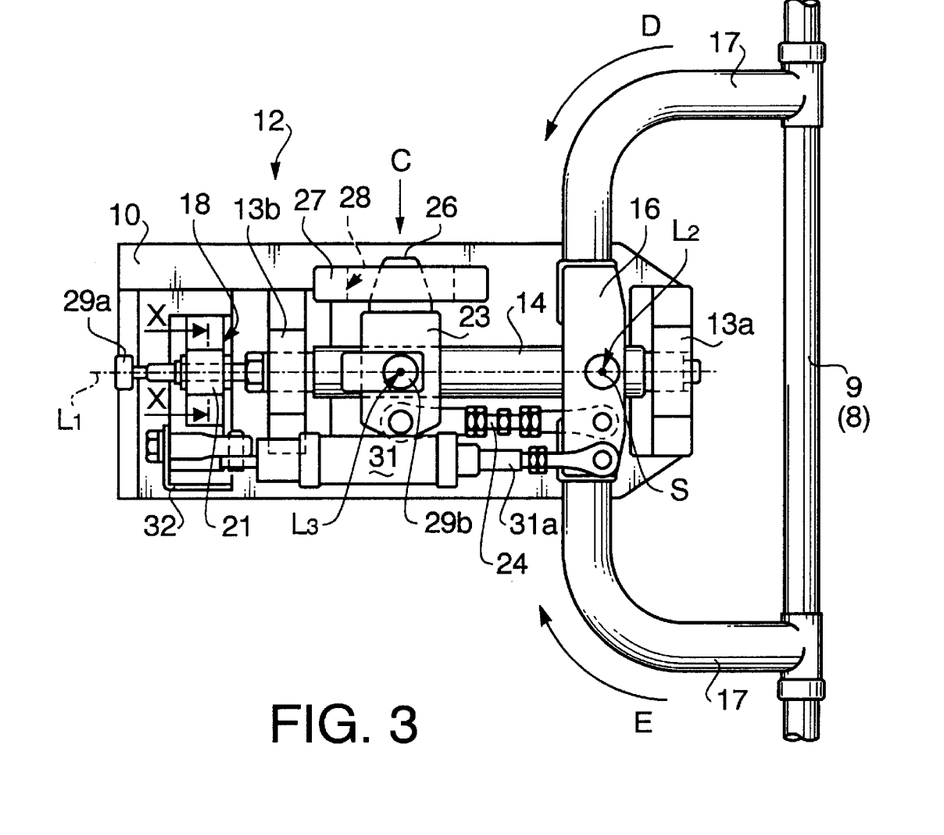
FIG. 3 is a plan view of an operational input device according to an embodiment of the present invention.
Figure 4:
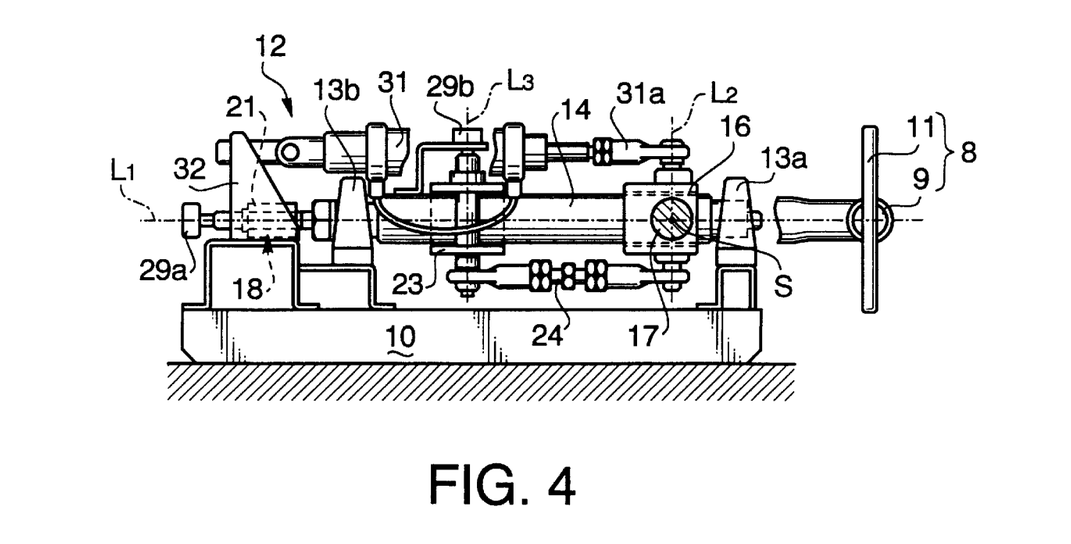
FIG. 4 is a partially cut away side view showing a construction of the device shown in FIG. 3.

A support structure 12 for supporting the grip bar 9 of the operational input member 8 is received in a head portion 3a of the operation unit 3 as shown in FIGS. 3 and 4. The support structure 12 has a rotary shaft 14 rotatably supported by bearings 13a and 13b about the horizontal axis L1. A rotary block 16 is provided with the rotary shaft 14 (right end of FIGS. 3 or 4) such that the rotary shaft 14 is rotatable about the horizontal axis L1. In order to make the rotary shaft 14 freely rotatable about the vertical axis L2, the rotary block 16 is provided on the rear end portion of the rotary shaft 14 and curved arms 17 are fixed to opposite ends of the rotary block 16. The grip bar 9 of the operational input unit 8 are supported by the curved arms 17.

With the above mentioned structure of the operational device, the grip bar 9, that is, the operational input unit 8, can freely rotate around the horizontal axis L1 as well as the vertical axis L2. Therefore, by gripping the grip bar 9 with both hands and turning the hands in vertical planes alternately, it is possible to rotate the grip bar 9 about the cross point S of the axes L1 and L2 such that a locus of the grip bar 9 becomes a three dimensional cone. This movement of the grip bar 9 simulates the paddling of the operator 7 on the canoe.

Figure 5:
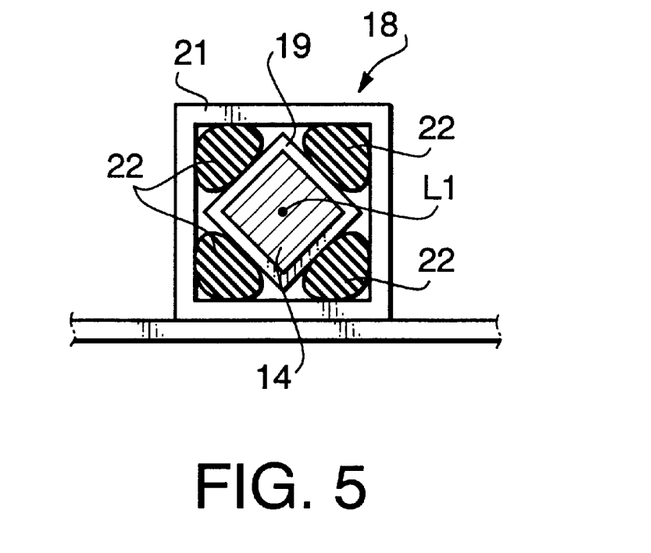
FIG. 5 is a cross section taken along a line X—X in FIG. 3.

A horizontal state sustaining mechanism 18 is provided in a rear end portion of the rotary shaft 14 as shown in FIGS. 3 and 4. FIG. 5 is a cross section of the horizontal state sustaining mechanism 18 taken along a line X—X in FIG. 3. As shown in FIG. 5, the horizontal state sustaining mechanism 18 is constructed with a pillar portion 19 having a square cross section and formed on a portion of an outer peripheral surface of the rotary shaft 14, a square tube 21 surrounding the pillar portion 19 and resilient members 22 received in four triangular spaces formed between the pillar portion 19 and the square tube 21, respectively. The resilient member 22 may be formed of, for example, rubber.

The rotary shaft 14 is supported in an angular position in which resilient forces given by the resilient members 22 are in equilibrium. This angular position coincides with the angular position in which the operational input unit 8 is substantially kept horizontal in FIG. 1. That is, the operational input unit 8 is not always necessary to be kept in an exact horizontal state and, even if the operational input unit 8 is slightly inclined from the exact horizontal state, the inclination is small enough to make the operator 7 possible to grasp the operational input unit 8 with both hands.

When the operator 7 who grasps the grip bar 9 of the operational input unit 8 with his hands tilts the grip bar 9 about the horizontal axis L1 by a suitable angle from the horizontal state thereof, the pillar portion 19 is rotated by the same angle to compress the respective resilient members 22 to thereby generate reactive force. On the contrary, when the rotational force given to the grip bar 9 by the operator 7 is reduced, the grip bar 9 is restored to the horizontal state by the reactive force and held therein. In this manner, the horizontal state sustaining mechanism 18 can also work as the resistive force application means for applying the reactive force, that is, the resistive force.

In FIGS. 3 and 4, a rotary block 23 is provided in a center portion of the rotary shaft 14. The rotary block 23 is rotatable with respect to the rotary shaft 14 around a vertical axis L3 extending longitudinally of the rotary shaft 14. One end of a connecting rod 24 is connected to one side of the rotary block 23 and the other end of the connecting rod 24 is connected to a bottom surface of the rotary block 16 on the side of the operational input unit 8. With this structure, when the operational input unit 8 is operated by the operator 7 to rotate the rotary block 16 on the operation side around the vertical axis L2 by a suitable angle, the rotary block 23 is rotated about the vertical axis L3 by the same angle.

A guided member 26 in the form of a conical guide protrusion protruding outward is provided on the other side of the rotary block 23. The guided member 26 penetrates a guide hole 28 formed in a guide plate 27. The guide hole 28 is circular when looked in a direction shown by an arrow C in FIG. 3. When the operational input unit 8 is rotated by the operator 7 three dimensionally about the horizontal and vertical axes L1 and L2, the rotary block 23 on the guide side is moved in the three dimensional space correspondingly. In such case, since there is the circular guide hole 28 around the guided member 26, the movement of the guided member 26 is restricted by the guide hole 28, so that the operational input unit 8 is prevented from being moved excessively by the operator 7.

A rotation angle detector 29a is connected to a rear end of the rotary shaft 14 as shown in FIG. 3. Further, a rotation angle detector 29b is provided on the axis L3 of the rotary block 23. The rotation angle of the operational input unit 8 around the horizontal axis L1 when the operational input unit 8 is moved three dimensionally by the operator 7 is detected by the rotation angle detector 29a and that around the vertical axis L2 is detected by the rotation angle detector 29b. Therefore, it is possible to specify the three dimensional position of the operational input unit 8 by combining output signals of the rotation angle detectors 29a and 29b.

A top end of a piston rod 31a of an air cylinder 31 is connected to an upper surface of a lower end portion of the rotary block 16 as the resistive force application means, as shown in FIG. 3. A rear end of the air cylinder 31 is supported by a bracket 32 provided on the base 10, as shown in FIG. 3. Although it is usual to connect an air supply source to an air input port of a conventional air cylinder, the air cylinder 31 of the present invention differs from such conventional air cylinder, as to be described below.

Figure 6:
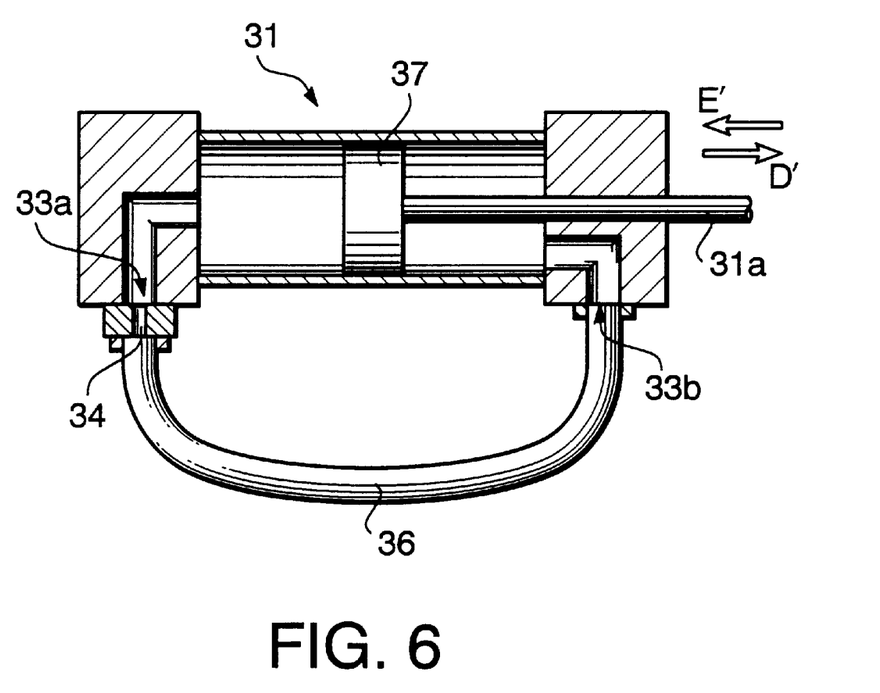
FIG. 6 is a cross sectional side view of an air cylinder for generating resistive force, which is a main portion of the structure shown in FIG. 3.

As shown in FIG. 6, a thin passage, that is, an orifice 34 is provided on one of the two input/output ports 33a and 33b, in this embodiment, the input/output port 33a, and the input/output ports 33a and 33b are communicated with each other by a hose 36. In FIG. 3, when the operational input unit 8 is rotated around the vertical axis L2 in a direction indicated by an arrow D or E, the piston rod 31a connected to the rotary block 16 moves relative to the air cylinder 31 in a direction shown by an arrow D' or E', correspondingly to the rotation of the operational input unit 8, as shown in FIG. 6.

In an initial stage of the movement of the piston 37 in either direction D' or E', a large resistive force is applied to the movement of the piston 37 by the presence of the orifice 34. Since air in the cylinder is compressible fluid, it produces a restoring force by compression thereof to thereby apply a reactive force to the grip bar 9. After a while from the start of the movement of the piston 37, air passes through the orifice 34 and the resistive force against the piston 37, that is, the reactive force is substantially reduced and hence the resistive force against the movement of the operational input unit 8 is substantially disappears. This application of resistive force provides a feeling very close to the practical paddling, in which a large resistive force given to a paddle when the latter is dipped in water is gradually reduced while the paddle moves in water, to the operator 7.

The effect of the resistive force application utilizing the orifice 34 can be obtained even when the input/output ports 33a and 33b are not communicated through the hose 36. However, when the hose 36 is not used, large air exhaust sound is generated when air starts to flow from the orifice 34 and the port 33b, which becomes obstacle in giving the reality to simulation. On the contrary, by connecting the input/output port 33a through the hose 36 to the input/output port 33b, it is possible to prevent exhaust sound from being produced.

Figure 7:
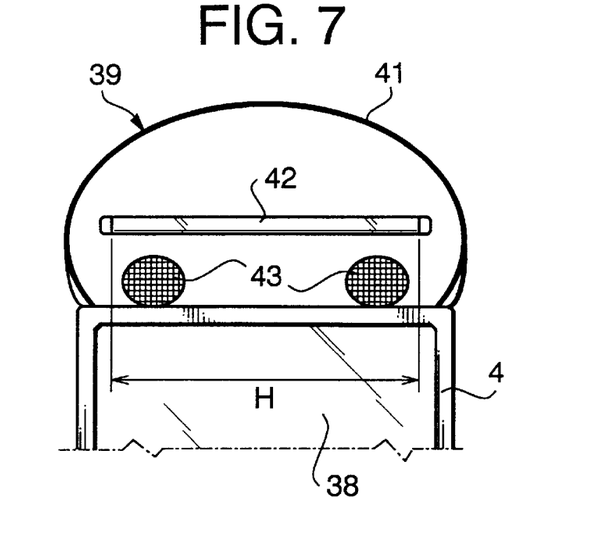
FIG. 7 is a front view of a main portion of the simulator shown in FIG. 1.

In FIG. 1, an optical display portion 39 is provided on an upper portion of the casing 4. An outer configuration of the optical display portion 39 is defined by a transparent plastic cover 41 and a fluorescent lamp 42 and loud speakers 43 are housed in the plastic cover 41. Sound generating portions of the loud speakers 43 are exposed through respective holes formed in the plastic cover 41. The loud speakers 43 are housed in the plastic cover 41 such that they are within a light range H covered by the fluorescent lamp 41, as shown in FIG. 7.

The plastic cover 41 of the optical display portion 39 is printed with a name of the simulator and other necessary patterns so that these patterns are clearly displayed when the fluorescent lamp 42 is lit. In the conventional simulator, the optical display portion is usually arranged separately from the loud speaker. In such construction, a space for the optical display portion is narrow, so that it is impossible to provide intrepid and attractive patterns.

In this embodiment of the present invention, however, it is possible to make the size of the plastic cover 41 large by housing the loud speakers 43 in the cover 41, so that it is possible to form effective and attractive patterns on the whole surface of the cover 41. Further, it is possible to effectively use the loud speakers 43 as a portion of the pattern. Further, since the light range H covered by the fluorescent lamp 42 is wider than an area covered by the loud speakers 43, it is possible to uniformly illuminate the whole surface of the wide plastic cover 41.

Figure 9:
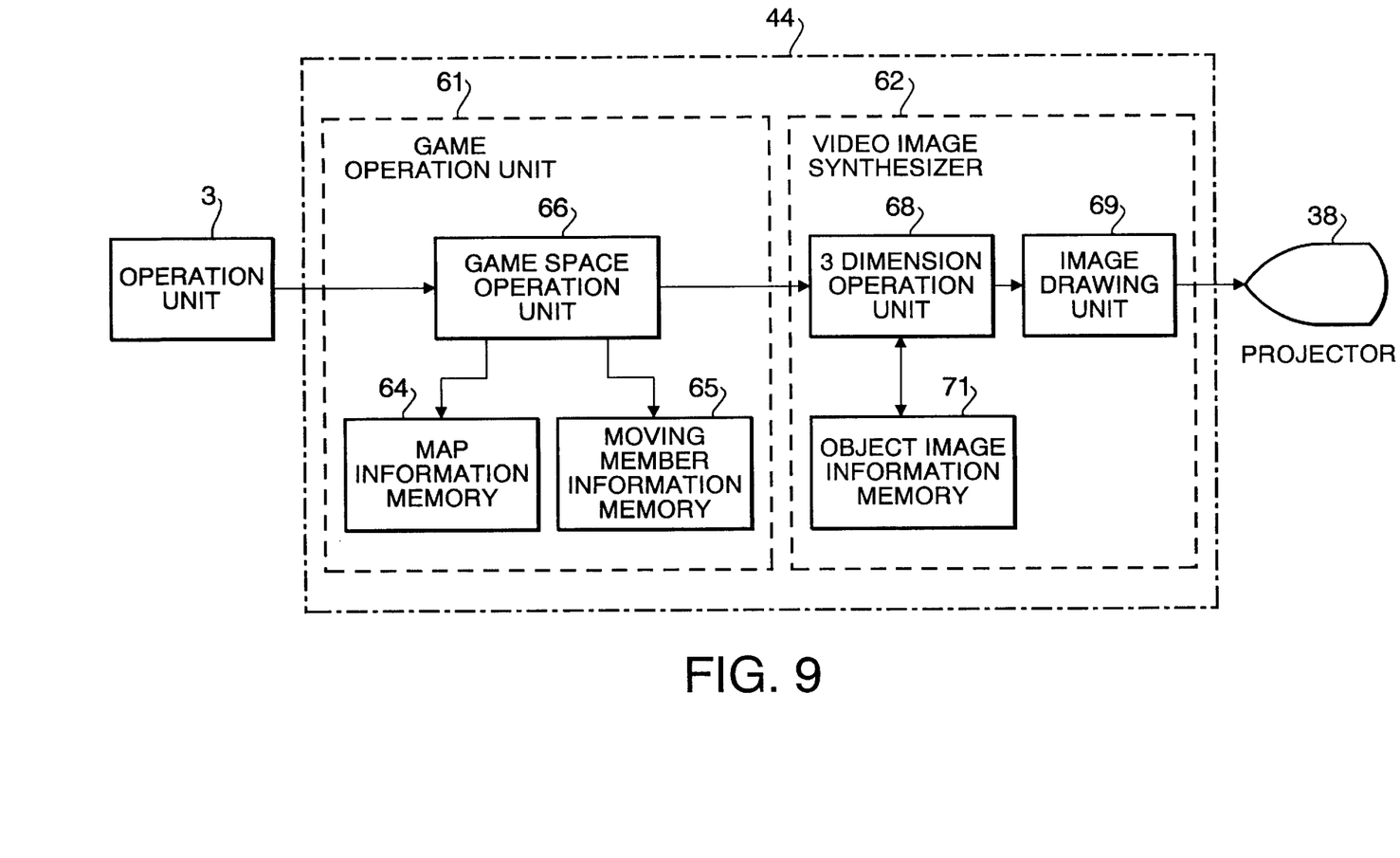
FIG. 9 is a block circuit diagram showing an example of a controller used in the simulator shown in FIG. 1.

Returning to FIG. 1, a projector 38 is provided in an upper front surface of the casing 4 as video display means and a controller 44 for controlling the projector 38 is provided within the casing 4. The controller 44 is constructed with an electronic circuit including a computer and includes, for example, a game operation unit 61 and a video image synthesizer 62 as shown in FIG. 9.

The game operation portion 61 includes a map information memory 64, a moving member information memory 65 and a game space operation unit 66. The map information memory 64 stores an information related to downstream courses of a canoe as a divided map information. That is, the course information is stored therein as coordinates and heights of respective points on a map. The moving member information memory 65 stores three dimensional coordinates of a current position of the operator 7. The game space operation unit 66 reads the current position of the operator 7 on the basis of the memory content of the moving member information memory 65 and operates a moving position of the operator 7 on the basis of an operation signal from the operation portion 3 and a terrain signal from the map information memory 64. In this embodiment in which the projector 38 is used as means for displaying a simulated operation, the memory content of the moving member information memory 65 is updated every 1/60 seconds on the basis of the operation of the game operation unit 66.

The image synthesizer 62 includes a three dimension operation unit 68, an image drawing unit 69 and an object image information memory 71. The object image information memory 71 stores an information necessary for producing a course image, for example, an image information corresponding to mountains, rivers, rocks and birds, etc. The three dimension operation unit 68 reads an image information corresponding to data output from the game space operation unit 66, that is, an information related to the operator and the divided map information, etc., from the object image information memory 71, operates a three dimensional virtual space and outputs it to the image drawing unit 69.

Figure 8:
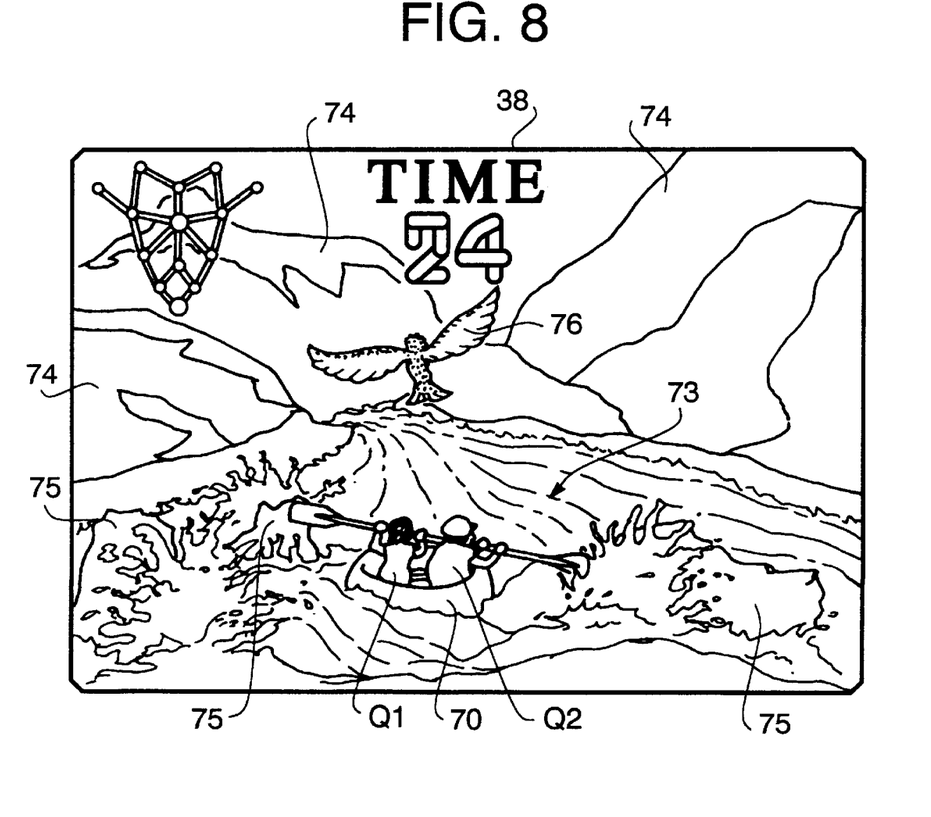
FIG. 8 shows an example of a picture displayed on a screen of a projector which is a main portion of the simulator shown in FIG. 1.

The image drawing unit 69 converts the output data from the three dimension operation unit 68 into a video data which can be displayed by the projector 38 and the video data of the virtual space is displayed by the projector 38 as a two dimensional image, as shown in FIG. 8 in which a downstream landscape including an image 70 of the canoe moving along a river is shown. This image is updated every 1/60 seconds on the basis of the operation of the game space operation unit 66 so that the operator can recognize a continuously changing downstream landscape. In FIG. 8, Q1 and Q2 depict two operators, 73 a river, 74 a rocky mountain, 75 a rock in the river and 76 a bird.

An operation of the simulator constructed as mentioned above will be described. In FIG. 2, one operator or a plurality of operators, two operators in this embodiment, sit on the seat 2. Since the seat 2 is made of a soft material, operators 7 may have a feeling of riding on the canoe. Thereafter, a predetermined amount of coin or coins are thrown into a coin receiving hole provided in a suitable portion of the operation portion 3 to start the simulation, in this embodiment, the downstream operation of the canoe. When the simulation is started, the downstream landscape and the character images Q1 and Q2 corresponding to the operators on the canoe image are displayed by the projector 38.

The operators 7 rotate the operational input unit 8 by hands such that they paddle, while watching the image displayed on the screen of the projector 38. The rotation angle position of the operational input unit 8 is detected by the angle detectors 29a and 29b (see FIGS. 3 and 4), the rotation speed of the operational input unit 8 is operated on the basis of a variation of the angle position thereof and an image 70 of the canoe moving downs along the river 73 at a speed corresponding to the rotation speed is displayed. During the downstream movement of the canoe, air is selectively supplied to one or a plurality of the air springs 6 shown in FIG. 1 according to the simulation program stored in the memory portion of the computer to selectively and continuously roll and/or pitch the seat 2 to thereby give the operators 7 a rolling and/or pitching situation of the canoe running along the river.

Further, the operators 7 operate the operational input unit 8 such that the canoe image 70 displayed on the screen of the projector 38 arrives at a goal point in the virtual space at a speed as high as possible while it does not collide with the rock image 75 or the rocky mountain image 74, etc. If the canoe image 70 collides with the rock image 75, etc., a large amount of air is supplied to one or more of the air springs 6 to swing the seat 2 abruptly so that the operators 7 experience a large shock of the collision.

When the operators 7 swing the operational input unit 8 about the vertical axis L2 as shown by the arrows E and D in FIG. 3, the piston rod 31a of the air cylinder 31 moves with respect to the air cylinder body. When the piston rod 31a moves in this manner, a situation that a large resistive force is applied to the operators in the initial stage of the movement and the resistive force is substantially removed at a short time lapses therefrom and there is no resistive force applied to the operators is realized. This situation gives the operators 7 a feeling very close to the practical paddling in which a large load is applied to a paddle operated by an operator in the initial stage in which the paddle strokes river water and the load disappears in a little while.

As described, according to this embodiment of the present invention, it is possible to move the canoe image 70 in the video image displayed on the screen of the projector 38 in a desired manner by an operator operating the operational input unit 8 as if it is a paddle while watching the downstream landscape displayed on the screen of the projector 38 and, therefore, it is possible to easily experience a canoeing without attending to a river. Since the grip bar 9 extends laterally of the operator 7, the operator 7 can easily perform a paddling of the canoe. Further, since a plurality of operators can grip the grip bar 9 simultaneously, it is possible to perform a paddling in cooperation with each other or an expert operator can simulate a paddling while teaching people who are unfamiliar with the paddling.

Figure 10:
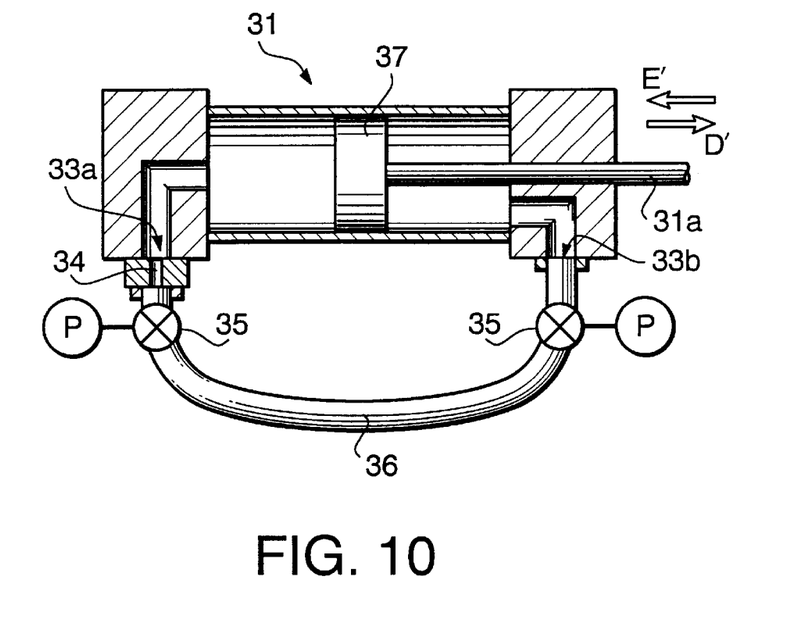
FIG. 10 is a cross sectional side view of another example of the air cylinder for generating resistive force.

FIG. 10 shows another embodiment of the resistive force application means for applying a resistive force to the grip bar 9. The embodiment shown in FIG. 10 differs from the embodiment shown in FIG. 6 in that an air pump P is connected through switch valves 35 to the air input/output ports 33a and 33b provided in the air cylinder 31. When the switch valves 35 are switched to the side of the hose 36, the embodiment shown in FIG. 10 functions in the same manner as that of the embodiment shown in FIG. 6 and, when the switch valves 35 are switched to the side of the pump P, air is supplied from the pump P to the air cylinder 31 to forcibly move the piston 37 to thereby forcibly apply reactive force or vibration, etc., to the grip bar 9.

Although the present invention has been described with reference to the preferred embodiments, the present invention is not limited thereto and can be modified in various manners within the scope of the present invention which is defined by the appended claims.

For example, although in the described embodiments the operational input unit according to the present invention has been described as to be applied to the simulator simulating a downstream canoeing, it is, of course, possible to apply the present operational input unit to other simulators simulating other arbitrary events.

Further, the operational input unit of the present invention is used not always to simulate the boat rowing operation such as paddling a canoe but also to simulate other arbitrary operations.

What is claimed is:

1. An operational input device for manually controlling an image displayed on a video display means, comprising a grip bar extending laterally of an operator of said operational input device and rotatable about two orthogonal rotation center axes, one of which extends toward the operator and the other of which intersects said one of said axes.

2. An operational input device as claimed in claim 1, wherein said grip bar is arranged in a position remote from one of said orthogonal two rotation center axes.

3. An operational input device as claimed in claim 2, further comprising a guided member movable in a three dimensional space together with said grip bar and a guide member having a circular guide hole for restricting a movement of said guided member.

4. An operational input device as claimed in claim 3, further comprising resistive force application means for applying a resistive force to said grip bar when said grip bar deviates from a neutral position thereof.

5. An operational input device as claimed in claim 4, wherein said resistive force application means includes an air cylinder having two air input/output ports positioned on both sides of a piston rod of said air cylinder and an orifice is provided in at least one of said air input/output ports.

6. An operational input device as claimed in claim 5, wherein said two air input/output ports are communicated with each other through a hose.

7. An operational input device as claimed in claim 6, wherein an air supply source is connected to at least one of said two air input/output ports of said air cylinder.

8. An operational input device as claimed in claim 1, wherein said grip bar defines a predetermined length capable of being held by a plurality of said operators.

9. An operational input device as claimed in claim 1, wherein said grip bar includes fins fixed at both ends thereof.

10. An operational input device as claimed in claim 1, wherein said one of said axes extends horizontally.

11. An operational input device as claimed in claim 10, wherein said other of said axes extends vertically.

12. An operational input device as claimed in claim 1, wherein said grip bar is rotatable about an intersection point of said two orthogonal rotation center axes.

13. An operational input device as claimed in claim 12, wherein rotation of said grip bar defines a locus of points forming a three dimensional cone, said rotation being capable of simulating the paddling of a canoe.

* * * * *